United States Patent
Tsunekawa

(10) Patent No.: US 6,734,989 B2
(45) Date of Patent: May 11, 2004

(54) IMAGE OUTPUT APPARATUS AND METHOD

(75) Inventor: Kiyohiro Tsunekawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/206,280

(22) Filed: Dec. 7, 1998

(65) Prior Publication Data

US 2002/0176101 A1 Nov. 28, 2002

(30) Foreign Application Priority Data

Dec. 12, 1997 (JP) .............................. 9-343222

(51) Int. Cl.[7] .................................. G06K 9/36
(52) U.S. Cl. ...................................... 358/1.9; 382/284
(58) Field of Search ................. 358/1.9, 403, 296–298; 382/284, 173–179, 305–306

(56) References Cited

U.S. PATENT DOCUMENTS

| | | | | |
|---|---|---|---|---|
| 4,604,696 A | * | 8/1986 | Suganuma et al. | 364/401 |
| 5,060,980 A | * | 10/1991 | Johnson et al. | 283/70 |
| 5,587,800 A | * | 12/1996 | Miyazaki | 358/296 |
| 5,737,503 A | * | 4/1998 | Mitani | 358/1.15 |
| 5,872,640 A | * | 2/1999 | Cohen et al. | 358/434 |

FOREIGN PATENT DOCUMENTS

| JP | 2000099301 | * | 4/2000 |
|---|---|---|---|
| JP | 2000198245 | * | 7/2000 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

Upon receiving print data from a host computer, a printer determines whether the data is an instruction for generating form data. If the print data is such an instruction, the printer generates the form data an image data, encodes the data and then stores the encoded data. If the print data is a print instruction other than the above-mentioned instruction, the printer determines whether the print data is a page to be overlaid on form data. If such is the case, the encoded form data is decoded and drawn and the data to be printed is output upon being superposed on the drawn form data.

29 Claims, 11 Drawing Sheets

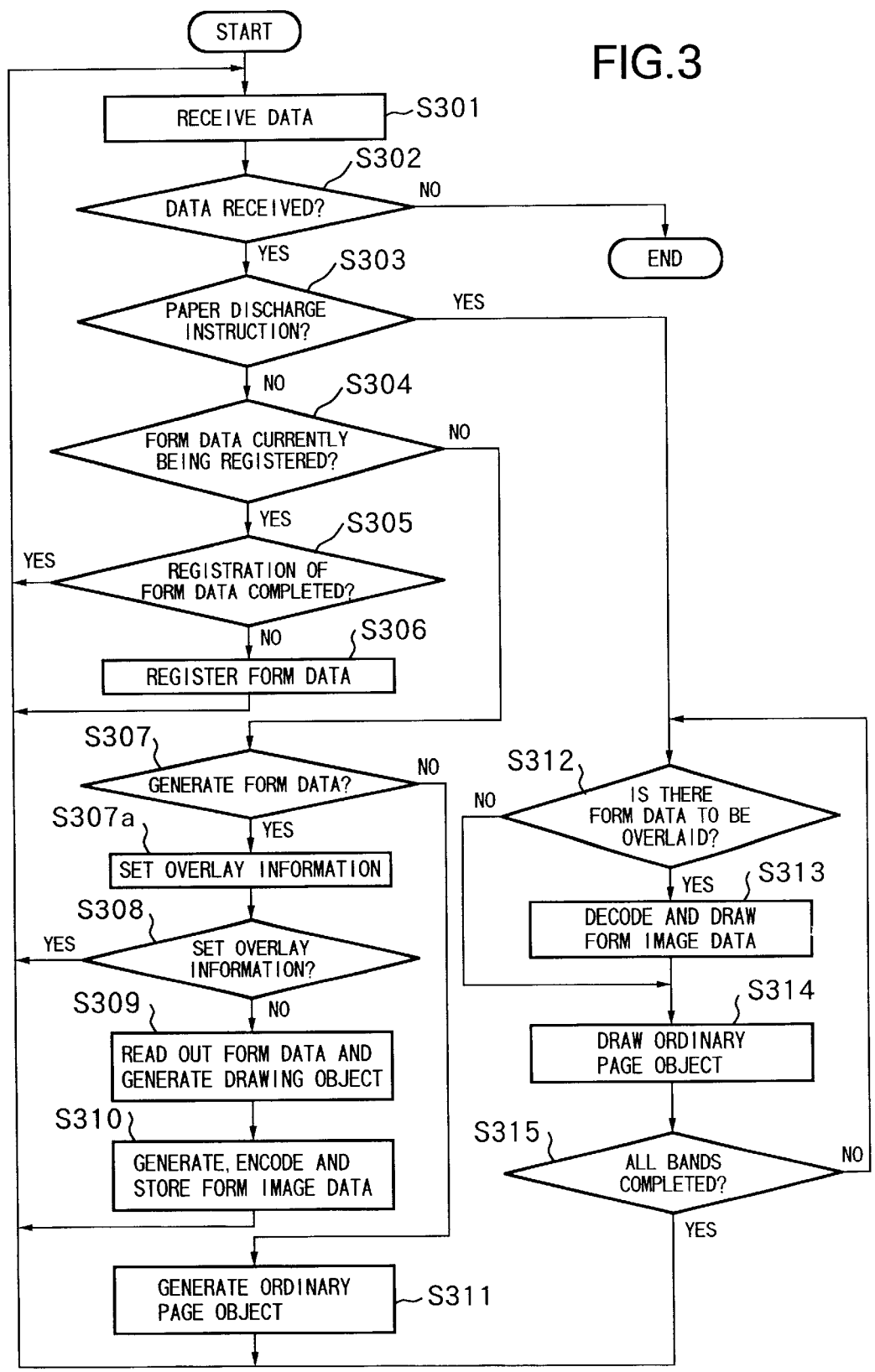

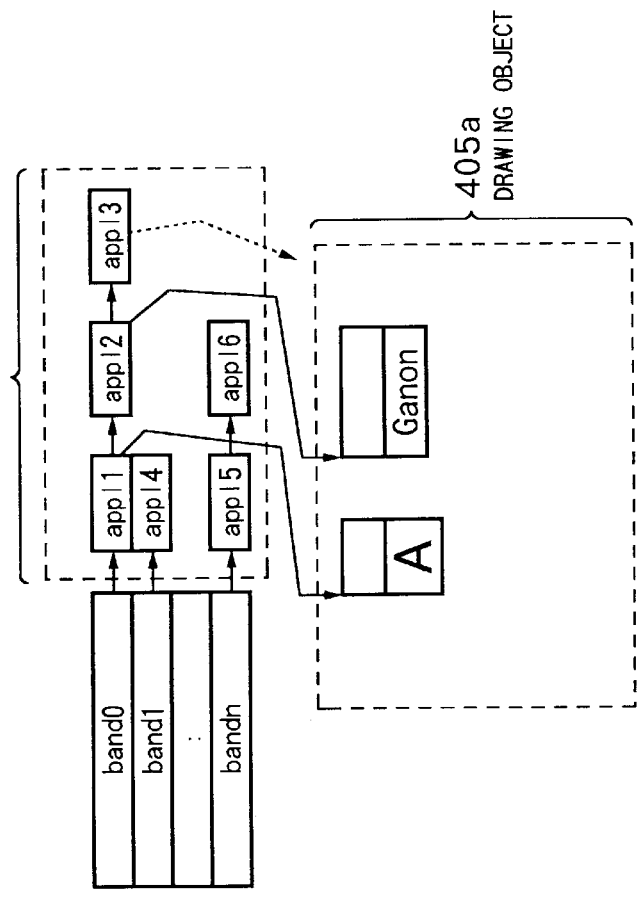
FIG.4A
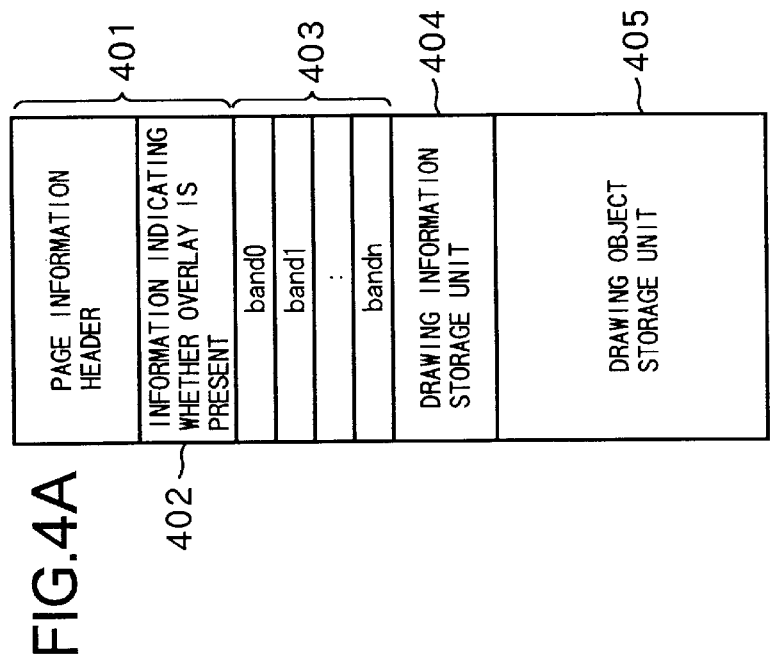
FIG.4B
FIG.4C

IMAGE OUTPUT APPARATUS AND METHOD

BACKGROUND OF THE INVENTION

This invention relates to an image output apparatus and method capable of outputting ordinary page data and form data, for example, in an overlaid state.

Ordinary business activities often require the printing of documents in which standard form data and non-standard data are superposed. The standard form data (titles and border lines), such as slips and standard documents, has the same content over a plurality of pages. The non-standard data (such as numerals and names, referred to as "ordinary page data" below) has content that differs on every page. Form overlay printing often is used to achieve printing of the type described.

In a conventional page printer in which print data described in page description language is analyzed and a raster image corresponding to the description is generated, form data described in the page description language is registered in the storage area of a printer as an event-driven macro instruction and the macro instruction is executed automatically in response to an event such as a paper discharge operation to implement form overlay printing. When the macro instruction is registered and when, say, a paper discharge instruction is received following the analysis of one page of ordinary page data, the registered content is read out, analyzed in the same manner as ordinary page data and converted to an intermediate code for generating one page of a raster image. An intermediate code generated from data described in page description language will be referred to as a drawing object below. A dot image that expresses a single character pattern is one example of a drawing object. An operation that uses drawing objects to generate image data in units of pages or bands is referred to as "drawing". Further, registering form data in a printer is referred to as "form registration". Form registration is carried out by a form registration instruction having a predetermined format.

A printing system that is available is adapted to transfer form data (a macro instruction) from a host computer to a printer before printing is executed, and to register the form data in a non-volatile memory such as a flash memory so that the form data need not be transferred each time. In such case only the instruction which specifies the form data in the flash memory as the event-driven macro is sent when printing is executed.

The problems set forth below, however, are encountered with the example of the prior art described above. Specifically, in a case where form overlay printing is implemented by an event-driven macro, the form data is described in the format of page description language. If the form data is complicated, therefore, the analysis of the form data per se and the generation of a drawing object take time. That is, in regard to output of the first page, the processing speed achievable is only equivalent to that obtained when a document containing a form is output as ordinary data without using overlaying. The more complicated the content of the form, the longer the time needed to process the form.

When print data in which the same form is used over a plurality of pages is output, the same macro instruction (command group) is analyzed and the same drawing objects are generated each time on a page-by-page basis. Consequently, printing speed from the second page onward cannot be raised regardless of the fact that forms of identical content are output. More specifically, the same drawing objects are generated for every page, i.e., a single drawing object cannot be shared by a plurality of pages. This means that the memory necessary for processing to draw a plurality of pages must be large in size, and there is the danger of a decline in performance as when waiting for paper discharge. In particular, when a complicated form containing figures and pictorial images is specified for overlay printing, errors such as inadequate image memory tend to occur. Thus, a solution to the above-mentioned problems is vital.

One solution that has been considered is to rasterize the form data in advance, store the rasterized data in a printer as image data (a form image) and draw the image data in a state in which it is superimposed on the ordinary page data. However, this is impractical as a large-capacity memory is necessary to hold one page of a form image. To be specific, a memory having a storage capacity of about 8 MB would be required to store a size-A4 monochrome image at a resolution of 600 dpi.

Further, if a form image is generated in regard to a form composed of simple straight lines or the like, the result would be a decline in the processing speed of one page and a decline in memory efficiency.

SUMMARY OF THE INVENTION

The present invention is made in consideration of the above problems and has as its objects to suppress an increase in the processing time in the forming unit even if the contents of the form is complicated. Furthermore, another object of the present invention is to increase the printing speed after the first page in a case where a form having the same contents is repeatedly printed. Furthermore, still another object of the present invention is to provide an image output apparatus and method which can suppress an increase in a necessary memory for rendering process of a plurality of pages.

In order to achieve the above object, according to the present invention, the image output apparatus comprises form storage means for encoding and storing form data generated as image data form generating means for generating form data as image data, encoding the form data and storing it in the form storage means and overlay output means for decoding the encoded form data that has been stored in the form storage means, superposing print data on the decoded form data and outputting the result in a case where the print data is to be output upon being overlaid on the form data.

In order to achieve the above object, according to the present invention, the image output method comprises a form generating step of generating form data as image data, encoding the form data and storing it in form storage means and an overlay output step of decoding the encoded form data that has been stored, superposing print data on the decoded form data and outputting the result in a case where the print data is to be output upon being overlaid on the form data.

In order to achieve the above object, according to the present invention, the computer-readable memory stores a program which causes a computer to implement the functions of form generating means for generating form data as image data, encoding the form data and storing it in form storage means and overlay output means for decoding the encoded form data that has been stored, superposing print data on the decoded form data and outputting the result in a case where the print data is to be output upon being overlaid on the form data.

In order to achieve the above object, according to the present invention, the image output system comprises a host apparatus for converting print data to a print instruction having a format in which it can be interpreted by a printing apparatus, outputting the print instruction, combining form data with print data and outputting the result and a printing apparatus for interpreting the print instruction output by said host apparatus and converting the print instruction to an image the host apparatus having means for measuring degree of complexity for each type of print data and means for instructing the printing apparatus to execute an encoding procedure that conforms to the degree of complexity measured and the printing apparatus encodes or decodes form data using the encoding procedure instructed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart illustrating an overlay printing processing procedure in the image output apparatus according to the first embodiment;

FIG. 4A is a memory map of a drawing object storage unit in the image output apparatus according to the first embodiment;

FIG. 4B is a diagram showing the manner in which drawing object management is performed;

FIG. 4C is a diagram showing the format of drawing information appended to a generated object;

DESCRIPTION OF THE PREFERRED EMBODIMENTS

First Embodiment

The construction of an image processing apparatus to which the present is applied will be described with reference to FIG. 1, which is a sectional view of the apparatus. This is an example in which the apparatus is a laser printer. It goes without saying, however, that the image processing apparatus to which the present invention is applicable is not limited to a laser printer and may be a printer that performs printing using another printing method.

Figure 1:
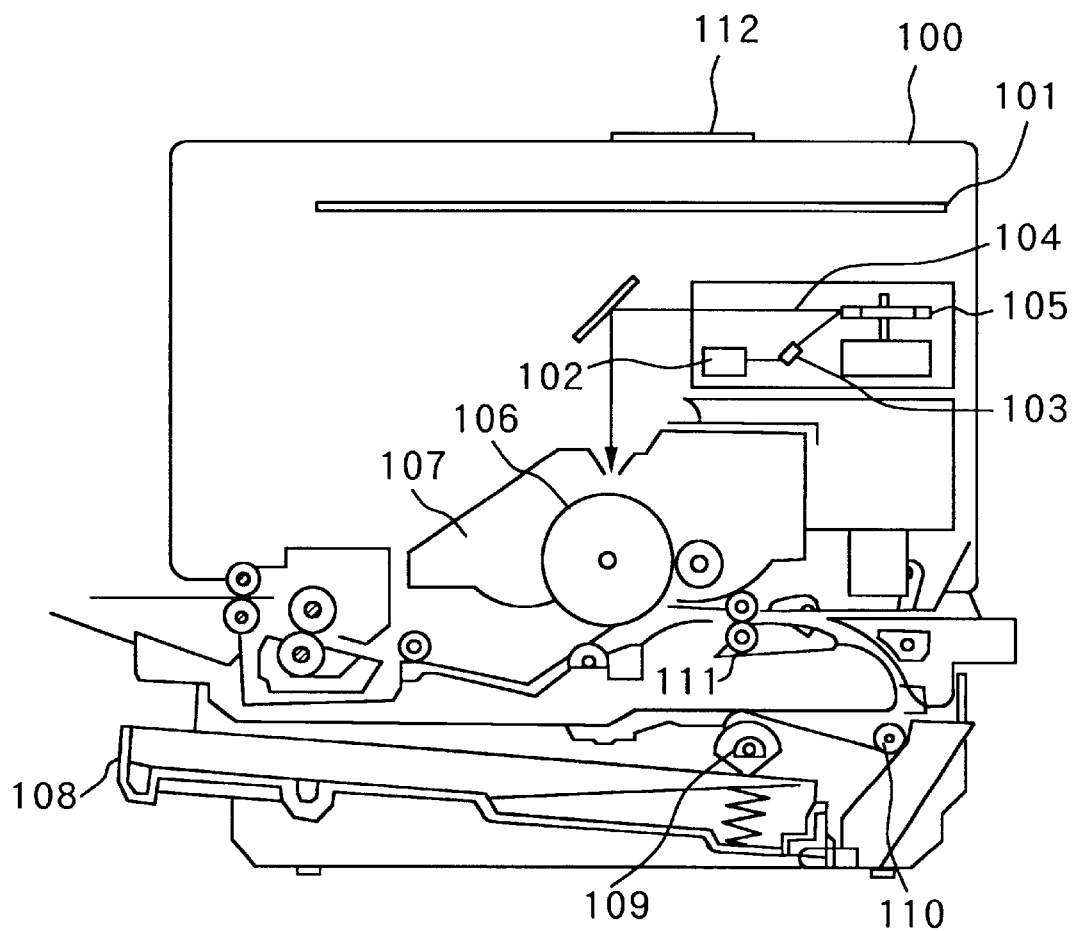
FIG. 1 is a sectional view illustrating a laser printer to which the present invention can be applied.

The laser printer, which is indicated at 100 in FIG. 1, stores character information (character codes and the like) and figure information, standard form data and other macro instructions supplied in the format of page description language from an externally connected host computer (200 in FIG. 2), creates character patterns and figure patterns in accordance with this information and forms the images on printing paper serving as the recording medium. A control panel 112 includes an array of operating switches and LED indicators. A printer control unit 101 performs overall control of the laser printer 100 and analyzes character information supplied from the host computer. The printer control unit 101 mainly converts character information to a video signal of the corresponding character pattern and outputs the video signal to a laser driver 102. Character patterns and form data from the host computer are registered in the laser printer. As executed in regard to the character information, the printer control unit 101 converts the registered data to a video signal the pattern of which conforms to the print data and outputs the video signal to the laser driver 102. The latter is a circuit for driving a semiconductor laser 103. Specifically, in dependence upon the video signal applied thereto, the laser driver 102 turns on and off a laser beam 104 emitted by the semiconductor laser 103. The laser beam 104 is deflected laterally by a rotating polygonal mirror 105 so as to scan an electrostatic drum 106. As a result, an electrostatic latent image is formed on the electrostatic drum 106. The latent image is developed by a developing unit 107 surrounding the electrostatic drum 106, after which the developed image is transferred to printing paper. The printing paper, which is in the form of cut sheets, is stored in a paper cassette 108 loaded in the laser printer 100 and is fed into the apparatus by a paper feed roller 109 and transport rollers 110, 111 so as to be supplied to the electrostatic drum 106.

Figure 2:
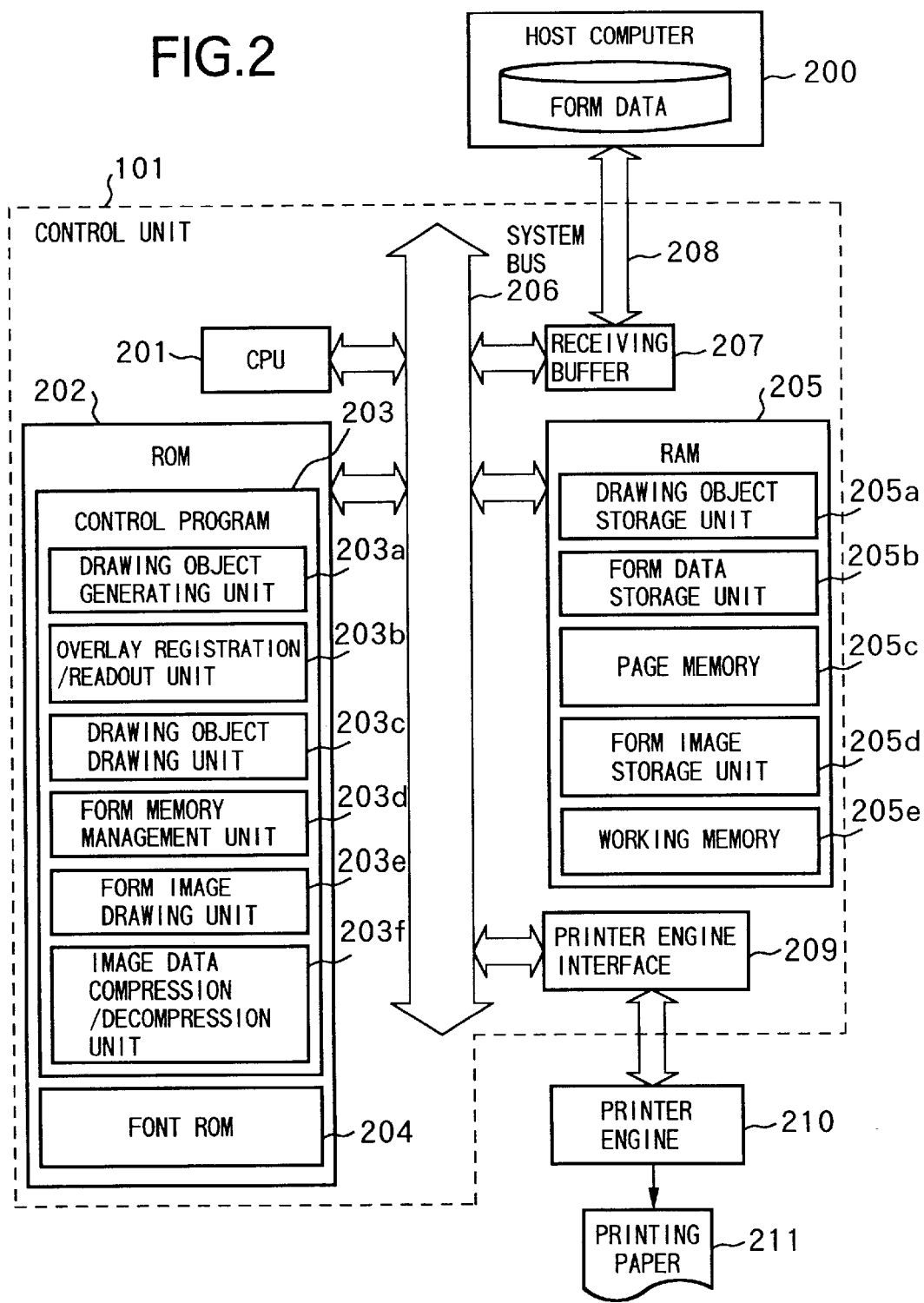
FIG. 2 is a block diagram illustrating an image output apparatus according to a first embodiment of the present invention.

FIG. 2 is a block diagram showing the printer control unit 101 of the laser printer 100 illustrated in FIG. 1. As long as the functions of the present invention are implemented, it does not matter if the processing is executed by a stand-alone device or by a system in which processing is executed via a network such as a LAN. In addition, the printer engine is not necessarily limited to a laser printer.

As shown in FIG. 2, the laser printer 100 is connected to an external host computer 200 via a prescribed interface 208. The arrangement is such that printing processing is executed in accordance with print data sent from the host computer 200. The print data received from the host computer 200 is temporarily stored as received data in a receiving buffer 207.

Form data expressed in the format of page description language is stored on a hard disk or the like within the host computer 200. The individual items of form data are managed by being mapped to information such as form IDs that are uniquely identifiable. When form overlay printing is performed, the form data is sent upon being added onto ordinary page data as a form registration instruction in order to perform overlay registration.

The printer has a CPU 201 for executing a control program 203, which has been stored in a ROM 202, to control overall access to various devices connected to a system bus 206 so that the following functions maybe performed: Specifically, print data that has been stored in the receiving buffer 207 is analyzed by a drawing object generating unit 203a to generate drawing objects of at least one page. Next, on the basis of the drawing objects, one page of a raster image or one band of a raster image, which is obtained by partitioning one page into a plurality of bands, is generated by a drawing object drawing unit 203c. Furthermore, a video signal which expresses the raster image by the on/off state of its bits is output to a printer engine 210 via a printer engine interface 209. The transmission of the video signal to the printer engine 210 shall be referred to as "shipping" below. The printer engine 210 prints an image on printing paper 211 based upon the video signal accepted from the CPU 201.

In a case where raster image memories for at least two bands obtained by partitioning a page along the raster lines are provided instead of one page of raster image memory, generation of the raster image and the shipping operation are performed in parallel. That is, while the raster image data in one band memory for which drawing has been completed is being shipped to the printer engine, a raster image is drawn in the other band memory. A technique for partitioning one page into bands and performing the generation and output of raster image data in parallel on a per-band basis shall be referred to as "banding processing" below.

The control program 203, in addition to the elements described above, is composed of program units for implementing the following functions:

Specifically, the control program 203 includes an overlay registration/readout unit 203b which, in a case where the print data in the receiving buffer 207 was a form registration instruction, registers the form data, which is described in page description language, in a RAM 205 and reads out the form data when a form overlay draw instruction is received, and the drawing object drawing unit 203c for generating raster image data based upon the form data that has been read out. The raster image data generated from the form data shall be referred to as "form image data". The control program 203 further includes a form memory management unit 203d for storing and retaining the form image data in the RAM 205, a form image drawing unit 203e for superposing the form image data on the ordinary image data and drawing the result in a page memory 205c, and an image data compression/decompression unit 203f for compressing (encoding) image data and decompressing (decoding) compressed image data. The form memory management unit 203d has a cache function. In a case where form data has been requested by the overlay registration/readout unit 203b, the form memory management unit 203d uses the cache function to investigate whether form image data corresponding to the requested form data has been stored in a form image storage unit 205d. If such form image data has been stored, the stored form image data is used without reading the form data out of a form data storage unit 205b. The ROM 202 is used also as a memory (font ROM 204) for storing font data consisting of dot fonts and scalable fonts used in character output.

The RAM 205 functions as the main memory and working memory of the CPU 201 and is so adapted that the memory capacity can be expanded by optional RAM connected to an expansion port, which is not shown. The RAM 205 is used as a drawing object storage unit 205a for storing a drawing object; a working memory 205e used temporarily by the drawing object generating unit 203a; the page memory 205c for storing raster image data corresponding to two bands or raster image data constituting one page; the form data storage unit 205b for storing form data described in page description language; the form image storage unit 205d for storing the form image data; a cache memory (not shown) for caching a character pattern developed based upon the scalable data in the font memory 204; and a memory (not shown) for storing printing environment data. The laser printer 100 is supplied with power from a power supply, not shown. Though it has been described that the form data is stored in the RAM 205, the form data may be stored in a non-volatile memory such as a flash memory.

Though it is described above that the apparatus constituting the present invention is provided in the form of a program stored in a ROM, this does not impose a limitation upon the invention. An arrangement may be adopted in which the control program 203 is supplied by a freely removable storage medium such as a floppy disk or magneto-optic disk, loaded in a RAM or the like and then executed. That is, the control program 203 may be executed upon being loaded into the RAM 205.

Overlay Output Processing Procedure

Reference will be had to the flowchart of FIG. 3 to describe an overlay output processing procedure executed in the image output apparatus constructed as set forth above. This procedure is implemented by executing the control program 203 using the CPU 201. The steps in FIG. 3 are executed by the program units of the control program 203.

The print data sent from the host computer 200 is stored in the receiving buffer 207 at step S301 and then it is determined at step S302 whether print data is present in the receiving buffer 207. Processing is terminated if no print data is present.

If print data is present in the buffer 207, on the other hand, the print data is analyzed starting at step S303. That is, it is determined at step S303 whether print data currently being executed is a paper discharge instruction. If it is judged that the data is not a paper discharge instruction, analysis of the print data continues from step S304. For the sake of simplicity, it is stated above that it is determined at step S303 whether the print data is a paper discharge instruction (form feed command). In actuality, however, control proceeds to processing from step S308 onward in similar fashion also in the case of print data that can be a cause of the paper discharge operation, such as the print data exceeding the lower end of the page during printing, brought about by a character printing position move instruction or the like.

It is determined at step S304 whether the print data is a form data registration start instruction or whether form data is currently being registered. If the answer is "YES", the form data is written to the form data storage unit 205b (step S306) until a form data registered end instruction is received (step S305). Control returns to step S301 to read in print data from the receiving buffer 207. In order to determine at step S304 whether form data is currently being registered, a flag that is reset to "0" when power is introduced is provided, the flag is set to "1" when the form data registration start instruction is received and the flag is reset when the form data registration end instruction is received (step S305). If the flag has been set, it is judged at step S304 that form data registration is in progress. Alternatively, the size of form data to be registered as a parameter of the form data registration start instruction may be accepted as the initial value of a downcounter and the downcounter may be incremented in conformity with the progress of form data reception. In such case it would be judged that form data is currently being registered if the content of the downcounter is not zero. In a printer in which the form data storage unit 205b is provided in a non-volatile memory such as a flash memory and form data is registered before print data starts being received, steps S304 through S306 need not be executed.

If it is determined at step S304 that registration of form data is not in progress, then it is determined at step S307 whether the print data is a form data generation instruction. If the answer is "YES", overlay information (described later) indicating the existence of form data that is to be superposed on an ordinary page undergoing processing is set in the drawing object storage unit 205a (step 307a) and it is determined whether form image data corresponding to the form data has already been registered in the form image storage unit 205d (step S308). The form image data is data that has been developed as raster image data.

If it is judged at step S308 that form image data corresponding to form data has already been registered in the form image storage unit 205d, then the receiving of print data continues to step S301 in order to analyze the print data.

If it is found at step S308 that form image data has not been registered, then control proceeds to step S309. Here form data that has been stored at step S306 is read out of the form data storage unit 205b and a drawing object corresponding to the form data is generated by the drawing object generating unit 203a. It should be noted that the generation of a drawing object at step S309 may be processing similar to that for analyzing data printed on an ordinary page and generating a drawing object executed at step S311, described later. However, a drawing object that corresponds to form data is stored in an area (e.g., working memory 205e) separate from that which stores the drawing object of an ordinary page. Further, at the same time that the drawing object corresponding to form data is generated, management information for identifying the form data also is stored in the working memory temporarily at step S309. The management information includes a form ID (specified by the host), paper size, paper printing direction and resolution, etc., uniquely decided for each form.

Step S309 is followed by step S310. Here form image data is generated by the drawing object drawing unit 203c, after which the form image data is encoded by the image-data compression/decompression unit 203f and the encoded form image data is stored in the form image storage unit 205d by the form memory management unit 203d. More specifically, image data is generated from the drawing object corresponding to the form data generated at step S309, the image data is stored in the page memory 205c temporarily and then in the form image storage unit 205d, and finally the drawing object stored in the working memory 205e is cleared.

In this embodiment, it is assumed that one page of form data is generated and stored at step S310 in a state in which the data has been partitioned into a plurality of bands. Furthermore, the height (length along a direction orthogonal to the raster lines) of a band obtained by this partitioning is assumed to be a fraction of the maximum band height capable of being stored in the page memory 205c, namely this maximum band height divided by a whole number. That is, in a case where it is possible to store bands having three heights, namely heights of 256 dots, 512 dots and 1024 dots, which depends upon the amount of installed memory, the form image data generated and stored would have a height of 256 dots. It should be noted that it will suffice if the procedure for generating form image data from drawing objects and storing the form image data in the form image storage unit 205d is executed in exactly the same manner as the procedure for generating raster image data from the drawing objects of an ordinary page.

If it is found at step S307 that the print data is not a form data generating instruction, then the print data is analyzed to be print data that is drawn on an ordinary page and drawing objects are generated at step S311. More specifically, in a case where the print data is a character print instruction, font information corresponding to the character information specified by the print data is read out of the font ROM 204, the corresponding dot pattern (drawing object) is generated and stored in the drawing object storage unit 205a together with printing position information and information necessary for drawing in the page memory, e.g., width, height and drawing logic, etc. In case of figure data and image data other than characters, the intermediate codes that correspond to the print instructions are generated in similar fashion.

If it is determined at step S303 that the print data is a paper discharge instruction (or an instruction equivalent to the paper discharge instruction), then information indicating whether form data is present, which information was set in the drawing object storage unit 205a at step S307a, is investigated (step S312). If form data to be overlaid is present, the form image drawing unit 203e reads one band of compressed form image data that has already been generated out of the form memory management unit 203d through steps S307–S310, decodes this form image data and stores it in the page memory 205c (step S313). This is followed by step S314, at which one band of the drawing objects of the ordinary page is read out of the drawing object storage unit 205a and is drawn in the page memory 205c in successive fashion. Steps S312–S214 are repeated in regard to all bands contained on one page (step S315) until the drawing of one page is finished. If processing for all bands is completed, control returns to step S301 in order to process the print data of the next page.

FIG. 4A is a memory map showing an area for one page in the drawing object storage unit 205a of an ordinary page, and FIG. 4B is a block diagram illustrating the general configuration for each band. In FIG. 4A, a header 401 stores various information relating to each page and is composed of information indicating page status such as page number, which is counted up when power is introduced, printing resolution, page size, number of bands, overall quantity of drawing objects belonging to the page and whether drawing is finished and shipping is in progress, and information 402 indicating whether form data to be drawn is present or not. A band table 403 includes records the number of which corresponds to the number of bands constructing one page. Drawing information 404a corresponding to individual drawing objects 405a to be printed in a band is linked to each record. Individual items of drawing information and drawing objects are stored in a drawing information storage unit 404 and drawing object storage unit 405, respectively.

FIG. 4C is a diagram showing the composition of one item of drawing information. The drawing information is designed to include the following as information for drawing a drawing object: printing position (offset value, in bit units, from the upper left end) in a band; height of the drawing object; logic for combining drawing objects into band image data; starting address of the drawing object; offset quantity (number of lines) from the starting line of the band in a case where the drawing object is drawn from somewhere in the middle of the band; and starting address of the next item of drawing information (the end of the link is made NULL). It will suffice if each item of information has at least the number of bits needed to express a designated paper by a designated resolution.

The processing at step S314 in FIG. 3 for drawing the drawing object of an ordinary page on a per-band basis involves sequentially reading out the linked drawing information 404a from the band table 403 and drawing the drawing objects in accordance with the printing position information and the like in each item of drawing information. In a case where form image data is generated at step S310 in FIG. 3, generation of the data using the same drawing object drawing unit 203c is made possible by adopting an arrangement exactly the same as that described above.

Figure 5:
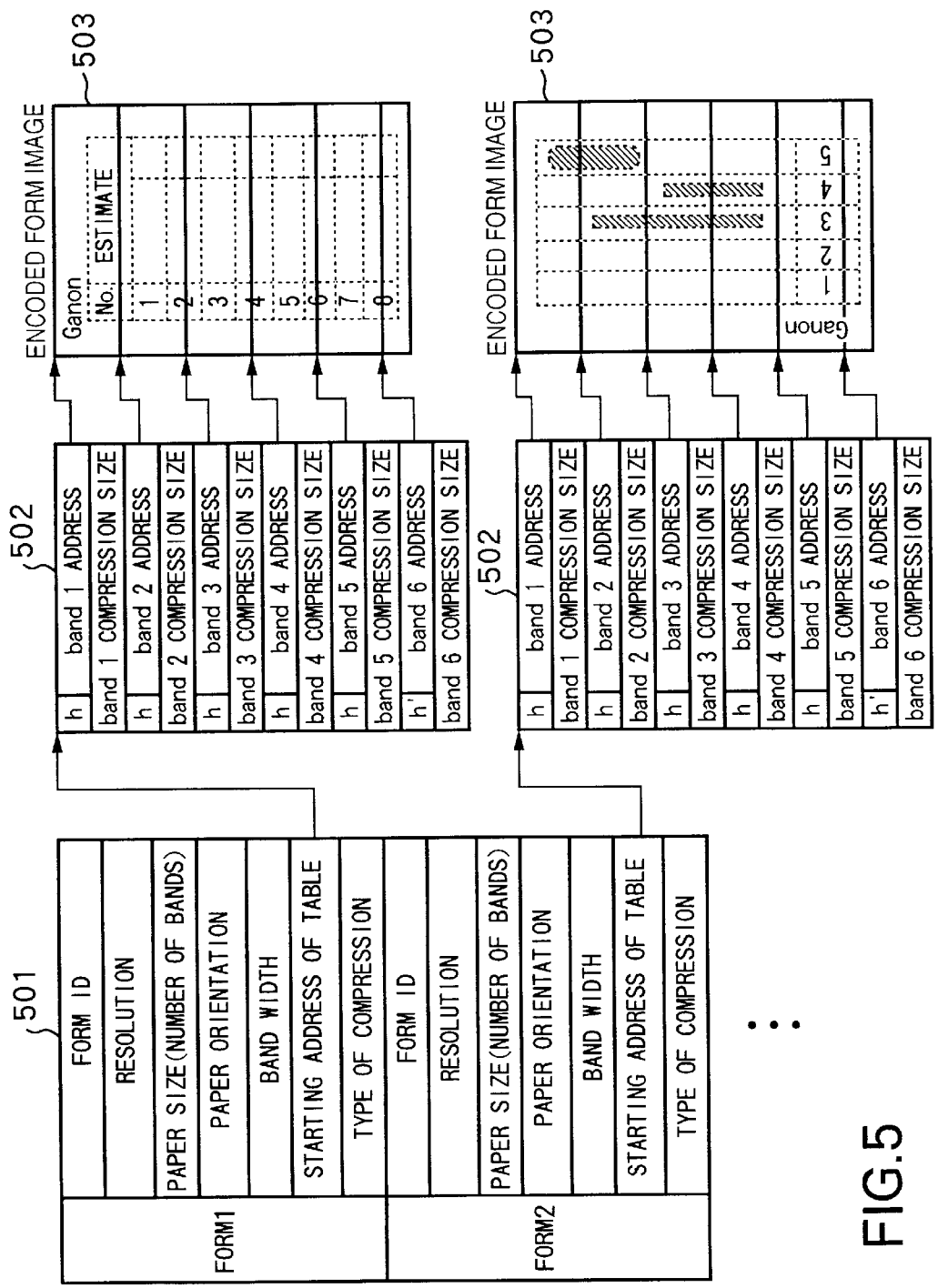
FIG. 5 is a block diagram illustrating a form image storage unit in the image output apparatus according to the first embodiment.

FIG. 5 is a diagram showing the construction of the memory of form image storage unit 205d managed by the form memory management unit 203d. As shown in FIG. 5, a management table 501 for each form is composed of form information needed to draw and identify each form. The storage area for the management table 501 may be acquired in a fixed area beforehand or may be arranged so as to be acquired dynamically. The management table 501 includes a form ID for identifying each form (management is by an ID identical with that specified by the host computer); printing resolution; total number of bands obtained by partitioning; paper orientation; bandwidth; and starting address of a form band table 502. The form band table 502, which is generated at step S310 in FIG. 3, stores information relating to the form image of every band. The form band table 502 has records the number of which conforms to the number of bands in the management table 501, and each record includes the starting address of each item of form image data and the height of each band. If height of the bands other than the height of the lowermost band is fixed, this value and the height of the lowermost band may be held in the management table 501. Among the information stored in the form management table 501, the resolution, paper orientation and band width are set on the basis of the print data or values set in advance at the control panel 112, and the form ID is specified as the parameter of a form registration instruction by the printer driver, etc., of the host.

Figure 6:
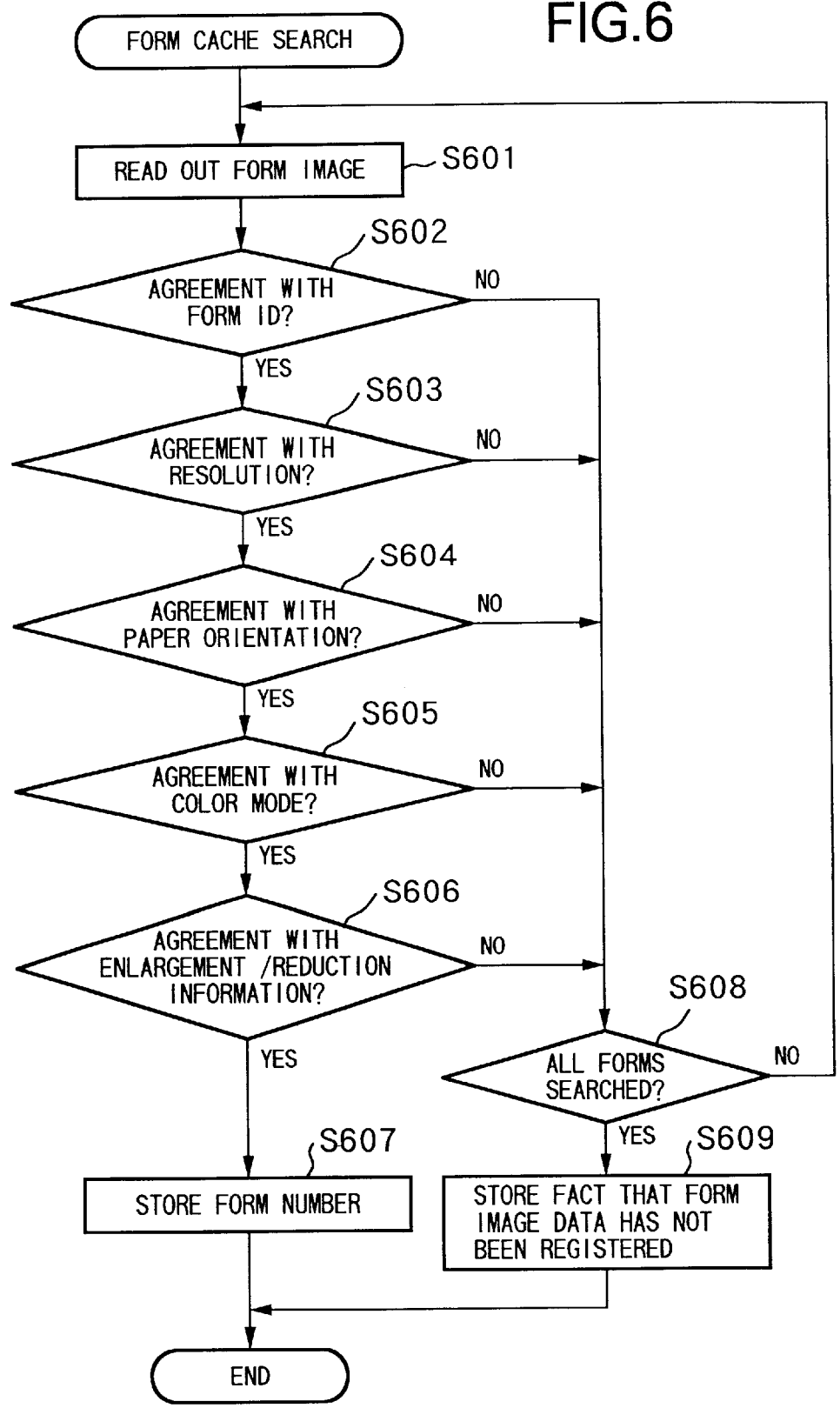
FIG. 6 is a flowchart of a form image search procedure in the image output apparatus according to the first embodiment.

FIG. 6 is a flowchart showing a procedure, which is executed by the form memory management unit 203d, for determining whether form image data corresponding to requested form data has already been registered in the form image storage unit 205d. This procedure corresponds to step S308 in FIG. 3.

First, at step S601 in FIG. 6, first form information is read out of the form management table 501 in form image storage unit 205d and it is determined whether the first form information agrees in regard to each item of form information specified by a form data generating instruction (steps S602–S606). More specifically, a comparison is made with each form ID (step S602). If a match is obtained, then a comparison is made with each resolution at step S603. If a match is not obtained, control proceeds to step S608 in order to read out the next item of form information. In case of a paper size for which longitudinal/transverse paper transport directions are supported, it is determined whether a match is obtained with regard to paper orientation (step S604). In case of a color printer, it is determined whether a match is obtained with regard to color mode (step S605). Next, it is determined whether a match is obtained with regard to a page enlargement/reduction designation (step S606). If agreement is achieved for all conditions, the form number is stored at step S607 as information indicating whether prepared form image data is present in the RAM 205. At step S308 in FIG. 3, reference is made to this information to judge whether a form image corresponding to the specified form has already been registered.

If a match is not obtained for any item of information at steps S602–S606, it is determined at step S608 whether the searching of all form image data is finished. If the answer is "NO", control returns to step S601. If the searching of all form image data is finished, the fact that form image data has not been registered is stored at step S609 as information indicating whether form image data is present or not.

By virtue of the foregoing procedure, form data described in page description language and registered by form data registration is converted to a drawing object by a form data generating instruction, the image data of the form is generated from this drawing object, and the image data is encoded and stored. If a page discharge instruction is received and it becomes clear during paper discharge that the page has an overlay, the encoded form image data that has been stored is decoded and developed in the band memory, an ordinary page object other than a form is drawn on the developed image data, the images are combined by designated logic and the result is printed.

By adopting this arrangement, form data once registered is stored as encoded image data. As a result, it is unnecessary to develop form data from page description language whenever a form data generating instruction is received. This makes it possible to achieve development of form data in the band memory at high speed.

In a case where the form data is not in the format of page description language but is transmitted as image data, processing for developing the form data into raster data is eliminated and it will suffice to encode the data as is and store the encoded data in memory.

Second Embodiment

In the first embodiment, form data is sent from the host to the printer together with an ordinary page object at the time of printing. However, if the form data is stored in a memory such as the flash ROM of the printer in advance, the time and resources needed to transmit the form data to the printer one item at a time can be reduced.

Figure 11:
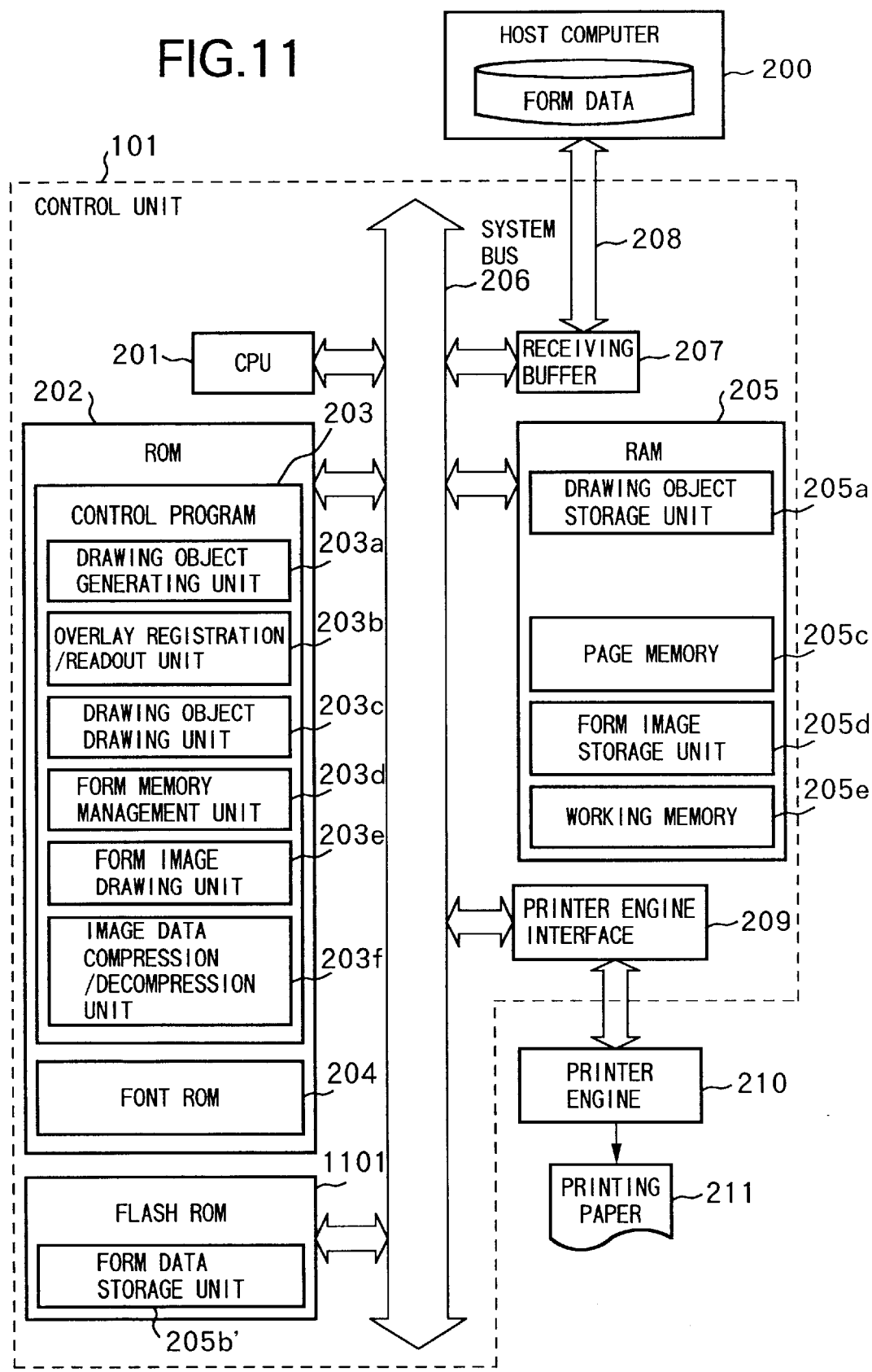
FIG. 11 is a block diagram illustrating an image output apparatus according to a second embodiment of the present invention.

FIG. 11 is a block diagram of a printer according to the second embodiment. This printer differs from that of FIG. 2 in that a form data storage unit 205b' is provided in a flash ROM 1101. The construction of the printer engine is that described in connection with FIG. 1, and the structure of the data retained is that shown in FIGS. 4A–5.

Figure 7:
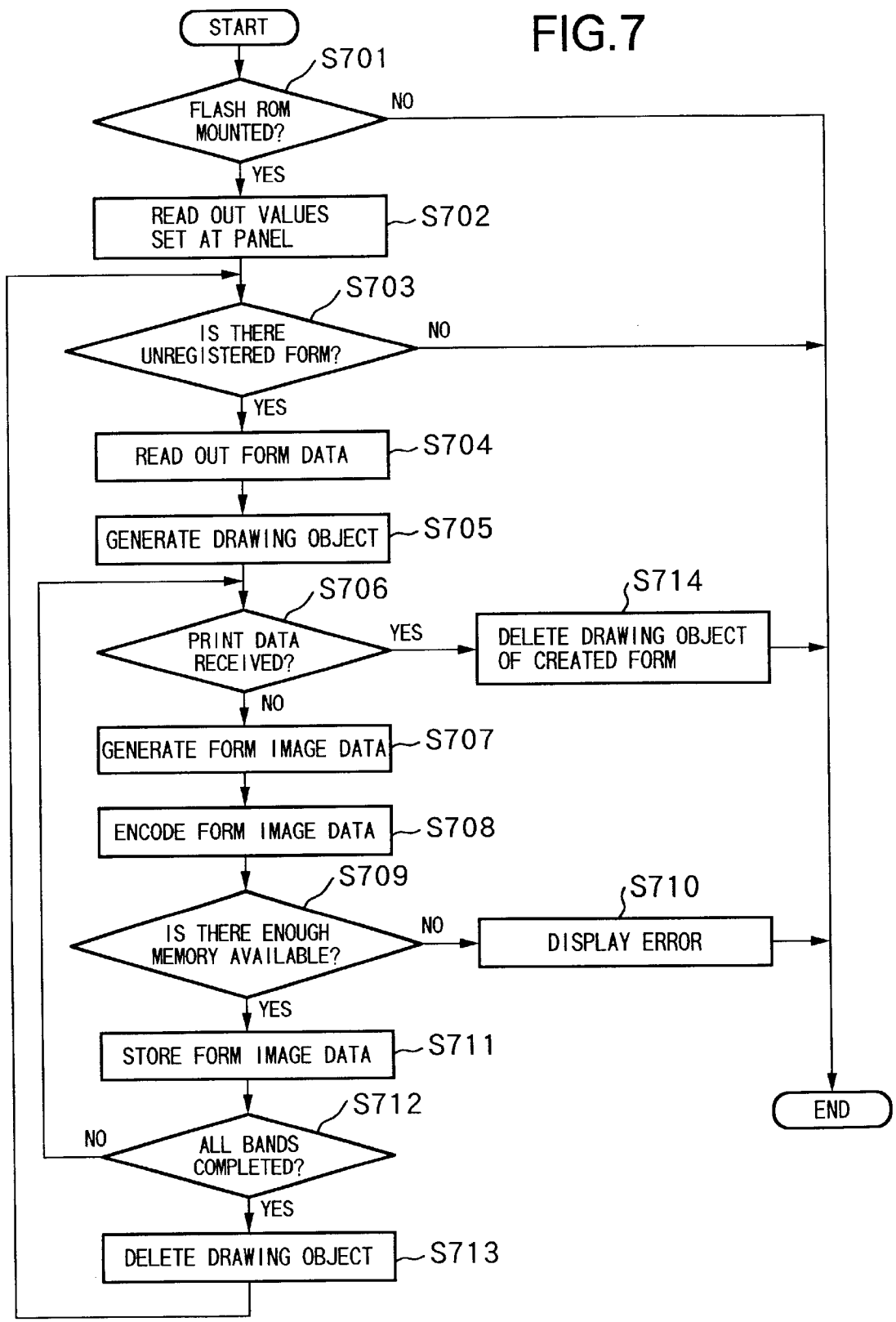
FIG. 7 is a flowchart of a form image generation procedure in the image output apparatus according to the first embodiment in a case where form data has been stored in a non-volatile memory.

FIG. 7 is a flowchart illustrating a form image generating procedure in a case where form data described in page description language has already been stored in a writable non-volatile device (described as being a flash ROM below) such as a flash ROM or hard disk. The processing indicated by this flowchart is executed immediately after power is introduced to the image output apparatus, before print data is received or in an idle period when print data to be processed is not being received. Alternatively, the processing is executed in accordance with an instruction, which is received from the host computer, before print data is received.

It is determined at step S701 in FIG. 7 whether the flash ROM has been mounted. Processing is terminated if the flash ROM has not been mounted. If it is found that the flash ROM has been mounted, however, then printing conditions necessary for rasterization (printing resolution, paper transport direction, color mode, etc.) set at the control panel or the like are read out of the flash ROM at step S702. Then, starting at step S703, form image data is generated from the form data that has been stored in the flash ROM and the form image data is registered in the form image storage unit 205d. First, it is determined at step S703 whether all of the form data in the flash ROM has been registered in the form image storage unit 205*d*. If unregistered data remains, this form data is read out at step S704 and one page of drawing objects is generated at step S705. This is followed by step S706, where it is determined whether print data has been received. If print data exists in the receiving buffer, an already generated drawing object corresponding to the form data is deleted at step S714, the working memory 205*e* that was being used is freed and then processing for generating a form image is terminated. If storage of a form image is currently in progress, the form image stored thus far is deleted and the memory is freed. In this embodiment, the existence of received data is checked only at step S706. However, this does not impose a limitation upon the present invention. The existence of the print data may be verified before or after a step requiring a comparatively long processing time or periodically using a timer or the like. This will make it possible to avoid the printing processing of ordinary data that does not employ a form.

In a case where print data has not been received, one band of a form image is drawn using the above-mentioned drawing objects at step S707, then this form image is encoded at step S708. This is followed by step S709, at which it is determined whether the form image storage unit 205*d* has enough memory capacity for registering the form image. If there is not enough memory capacity available, an error display is presented at step S710, after which processing is terminated. If there is enough memory capacity available, however, the encoded form image is stored at step S711.

The processing of steps S706–S711 is repeated in regard to all bands included on one page (step S712). When the generation of one band of a form image and compression processing have been completed, unnecessary drawing objects are deleted at step S713 and the processing of one form is terminated. In this embodiment, an error display is presented and processing is suspended when memory capacity is inadequate. However, the priority of each form may be specified or the frequency of use of each form may be stored together with the form data by a setting performed at control panel or host computer. In such case forms would be deleted from the form image storage area in the order of increasing priority or frequency of use to make possible the processing for storing form images using the memory space thus made available.

If processing for storing form data in a flash ROM in advance, developing this data into raster data in a period during which the printer is idle and then compressing the data is thus executed in addition to the procedure of the first embodiment, the labor involved in developing the form data after the print data is received can be eliminated, thereby making it possible to speed up processing. Further, a form that has not been registered in the flash ROM can be dealt with by receiving it from the host and then developing, encoding and storing the data through the procedure of the first embodiment.

Third Embodiment

In the first and second embodiments, form data is always rasterized and then encoded, decoded and drawn upon being superposed on ordinary page data regardless of the content of form overlay. Consequently, in a case where the content of the form data is very simple, there are instances where the overhead of processing for managing the form image becomes too large, making it impossible to achieve high-speed processing. Further, when a plurality of items of form data are to be printed, a major increase in processing speed can be attained if priority is given to the storage of complicated form data images. According to this embodiment, therefore, whether or not a form image cache is implement is determined in dependence upon the content (degree of complexity) of form data.

Figure 8:
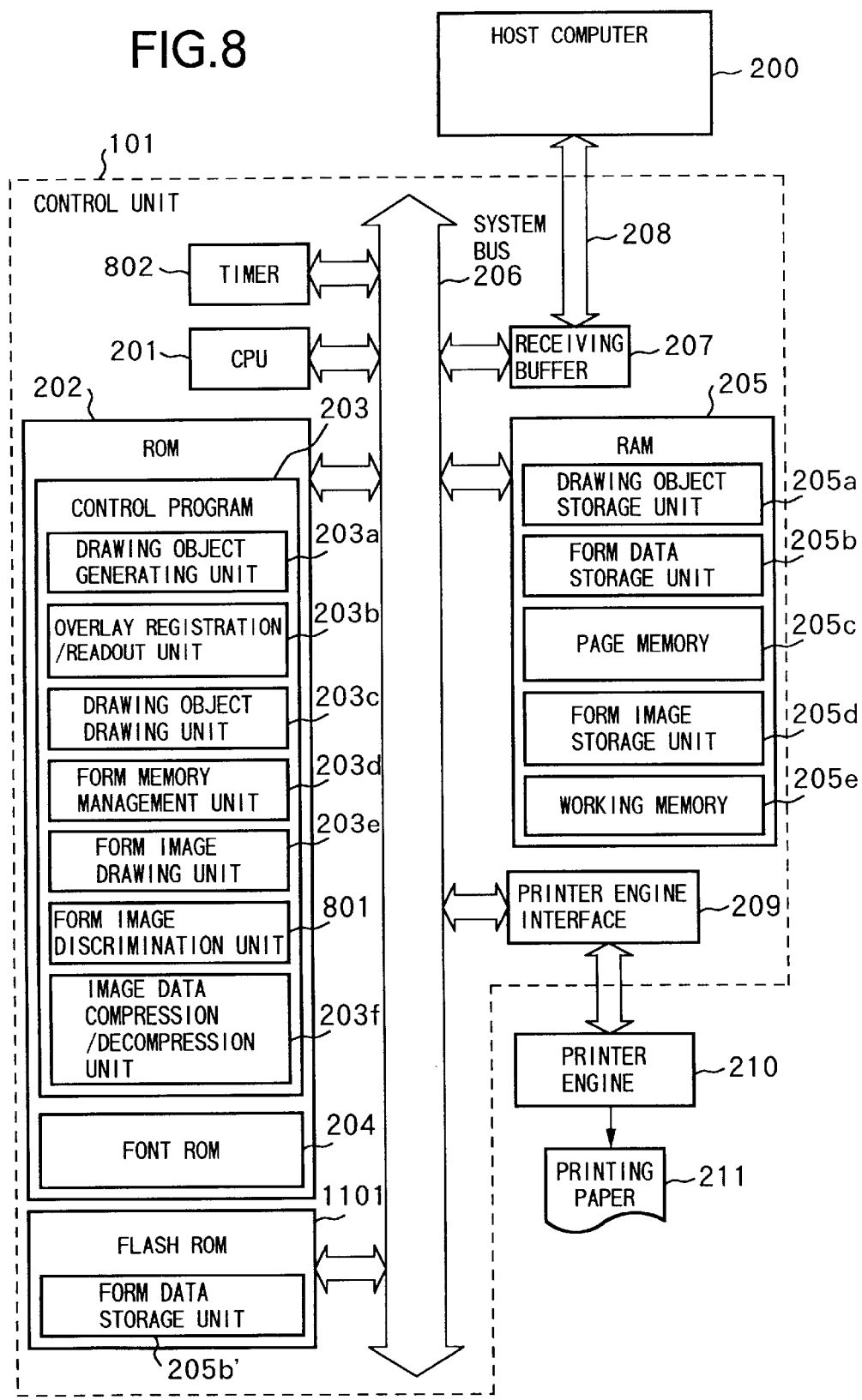
FIG. 8 is a block diagram illustrating an image output apparatus according to a third embodiment of the present invention.

FIG. 8 is a block diagram of the control unit 101 of printer 100 according to the third embodiment. Components identical with those of the first and second embodiments are designated by like reference characters and need not be described again. In FIG. 8, a form image discrimination unit 801 includes a program for measuring the processing cost of a drawing object in the form data, and a program for deciding, in accordance with the result of measurement by the above-mentioned program, whether a form image is to be generated and retained (cached). The form image discrimination unit 801 operates as part of the control program 203. A timer 802 measures real time.

Figure 9:
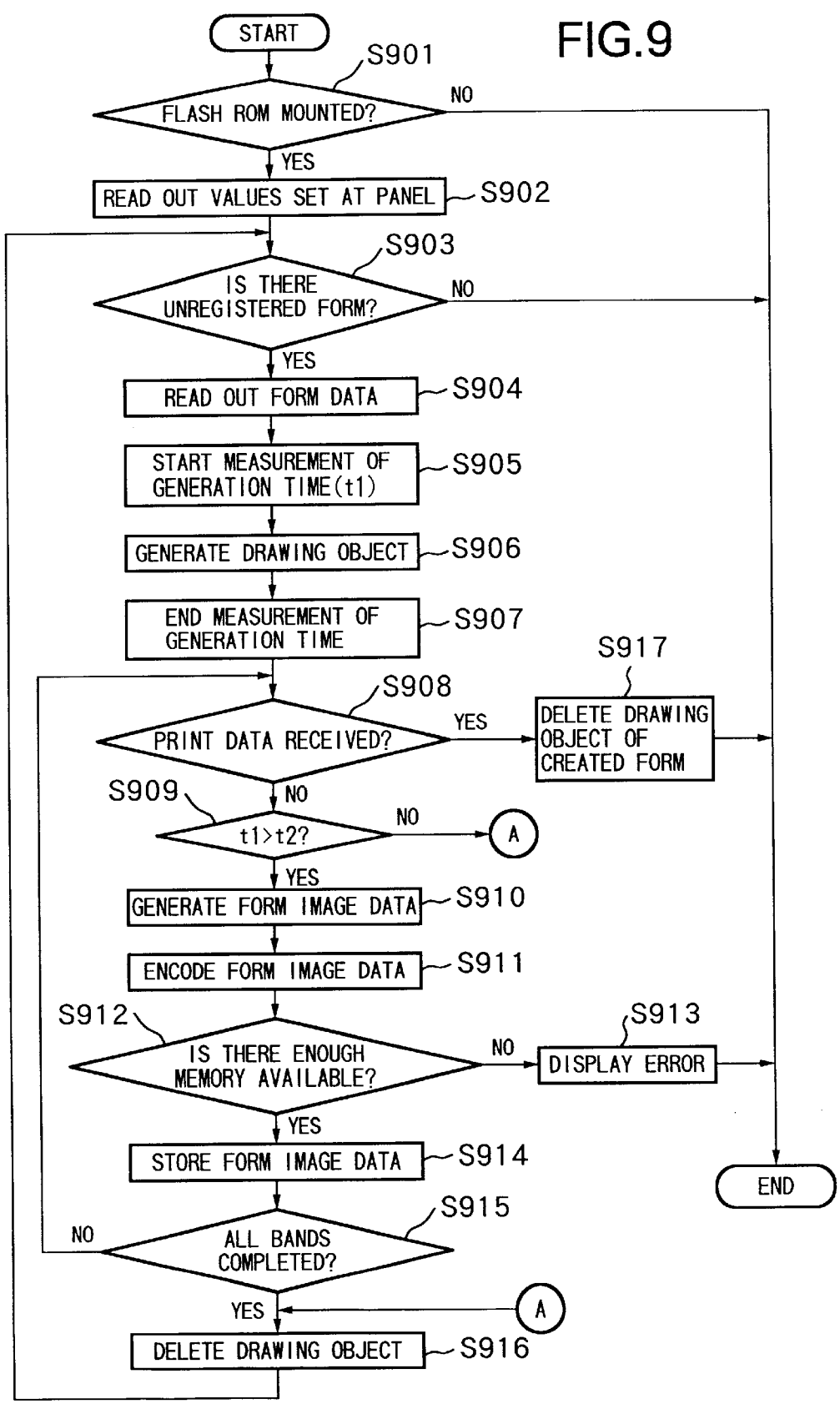
FIG. 9 is a flowchart of a form image generation procedure in the image output apparatus according to the second embodiment.

FIG. 9 is a flowchart illustrating a processing procedure for generating a form image according to this embodiment. FIG. 9 will be described in regard to a case where form data in a flash ROM is read out and drawing objects are generated in idle time during which there is no received data. According to this embodiment, time from the beginning to the end of form data analysis is measured as processing cost when drawing objects corresponding to form data are generated, this is compared with a processing speed parameter (paper transport speed, etc.) of the printer apparatus, and a changeover as to whether or not to cache a form image is made in accordance with the result of the comparison.

In FIG. 9, steps S901–S904 and steps S910–S917 are similar to steps S701–S704, steps S707–S714, respectively, and need not be described again.

After form data for which form image data has not been registered is read out by steps S901–S904, present time information is acquired from the timer 802 at step S905. This is followed by step S906, at which drawing objects of one form are generated, and by step S907, at which present time information is acquired again and the difference between this item of time information and that acquired at step S905 is determined to thereby obtain generation time t1. Suspension processing (S908, S914) in a case where print data has been received is similar to the processing of steps S706, S714 of FIG. 7.

The generation time (t1) obtained at step S907 needed to create a drawing object and a time (t2) required to transport one sheet of paper are compared at step S909. If t1>t2 holds, form image data is generated by processing from step S910 onward. The time t2 required for paper transport is a parameter decided by the characteristic of the printing unit (printer engine) 210. For example, in case of a printer engine that is capable of outputting size A4 paper at a rate of eight sheets per minute, the processing time per sheet is $$\frac{60 \text{ s}}{8} = 7.5 \text{ s}.$$

In other words, in a case where a plurality of pages are output in succession, processing for realizing the maximum engine performance of eight sheets per minute can be achieved if it possible to generate the drawing objects of the next page within 7.5 s. It should be noted that although the transport time for one sheet of paper is compared with the drawing object generation time required for one form, this does not impose a limitation upon the invention. That is, the transport time for one sheet of paper may be compared with a time obtained by subtracting, from the transport time for one sheet of paper, the previously estimated processing time for the drawing objects drawn on an ordinary page. Since the time needed to create the drawing objects of an ordinary page cannot be measured at this time, it is arranged so that the time subtracted can be set at the control panel or the like.

If it is found at step S909 that t1≦t2 holds, it is decided that this form data should not be cached, the generated drawing objects are deleted (step S916) and control proceeds to the processing of the next item of form data. In regard to form data for which it has been decided that form image data is not to be generated, it is necessary to so arrange it that form image data will not be judged as being unregistered at the time of print data processing, thereby preventing registration of the form image data. To accomplish this, the form ID of the form data is stored in memory beforehand, drawing objects of the form data are generated in a manner similar to that of an ordinary page and the drawing objects are drawn in the band buffer.

By virtue of the processing procedure described above, the time needed to develop object data representing a form is measured as an indication of the complexity of the form data. If the time exceeds a fixed threshold value, the form image is generated and cached. Consequently, in a case where the amount of memory allocated to the form image storage unit 205d is small, the printing speed achieved when processing a plurality of forms rises. If the time needed to transport one sheet of paper is used as the fixed threshold value, then, even in regard to form data for which it has been decided not to cache form image data, the form can be developed during the transport of the paper. As a result, image printout is not delayed.

Further, according to this embodiment, judgment is made based upon the processing time of one entire form. However, processing cost may be measured by type of drawing object. For example, when a scalable font is printed as part of a form, the bitmap data of a character is cached in a font cache on a per-character basis. As a result, processing time from the second page onward is shortened and there are cases where actual processing time is not as long as that needed for measurement when a drawing object is generated. In case of character data, therefore, the difference between processing time needed to scale one character and processing time in a case where a hit has occurred in the font cache is multiplied by the number of characters scaled, the resulting product is subtracted from overall processing time and the difference is adopted as the processing time. This makes it possible to measure processing cost more accurately in a case where the same form is used for two or more pages.

Further, this embodiment is such that drawing objects that have been generated are deleted in a case where it is judged that a form image should not be cached. However, an arrangement may be adopted in which the drawing objects are not deleted but retained temporarily together with form identification information such as the form ID, and the drawing objects are linked to the drawing objects of an ordinary page at the time of print data processing.

Further, according to this embodiment, the caching of a form image is turned on or off based upon the processing cost of a drawing object. However, an arrangement may be adopted in which the cache is turned on or off depending upon the available capacity of the form image storage unit 205d. That is, even when the cost (t1) of generating a drawing object is less than a threshold value (t2), a form image is generated if there is available memory. Alternatively, an arrangement maybe adopted in which if the amount of available memory is large, the threshold value is reduced and more form images are generated.

Fourth Embodiment

According to the first embodiment, form data is rasterized and then encoded and decoded by the image-data compression/decompression unit 203f and is drawn upon being superposed on ordinary page data regardless of the content of form overlay. Consequently, depending upon the content of the form data, there are cases where the size of the form image data after encoding is so large that a plurality of items of form image data can no longer be retained. As a result, the printer according to this embodiment is provided with a compression/decompression unit capable of encoding and decoding image data by a plurality of encoding/decoding methods, and one suitable encoding/decoding method is selected in dependence upon memory capacity capable of being allocated for form image retention or in conformity with form data content (the type and degree of complexity of a generated drawing object).

Figure 10:
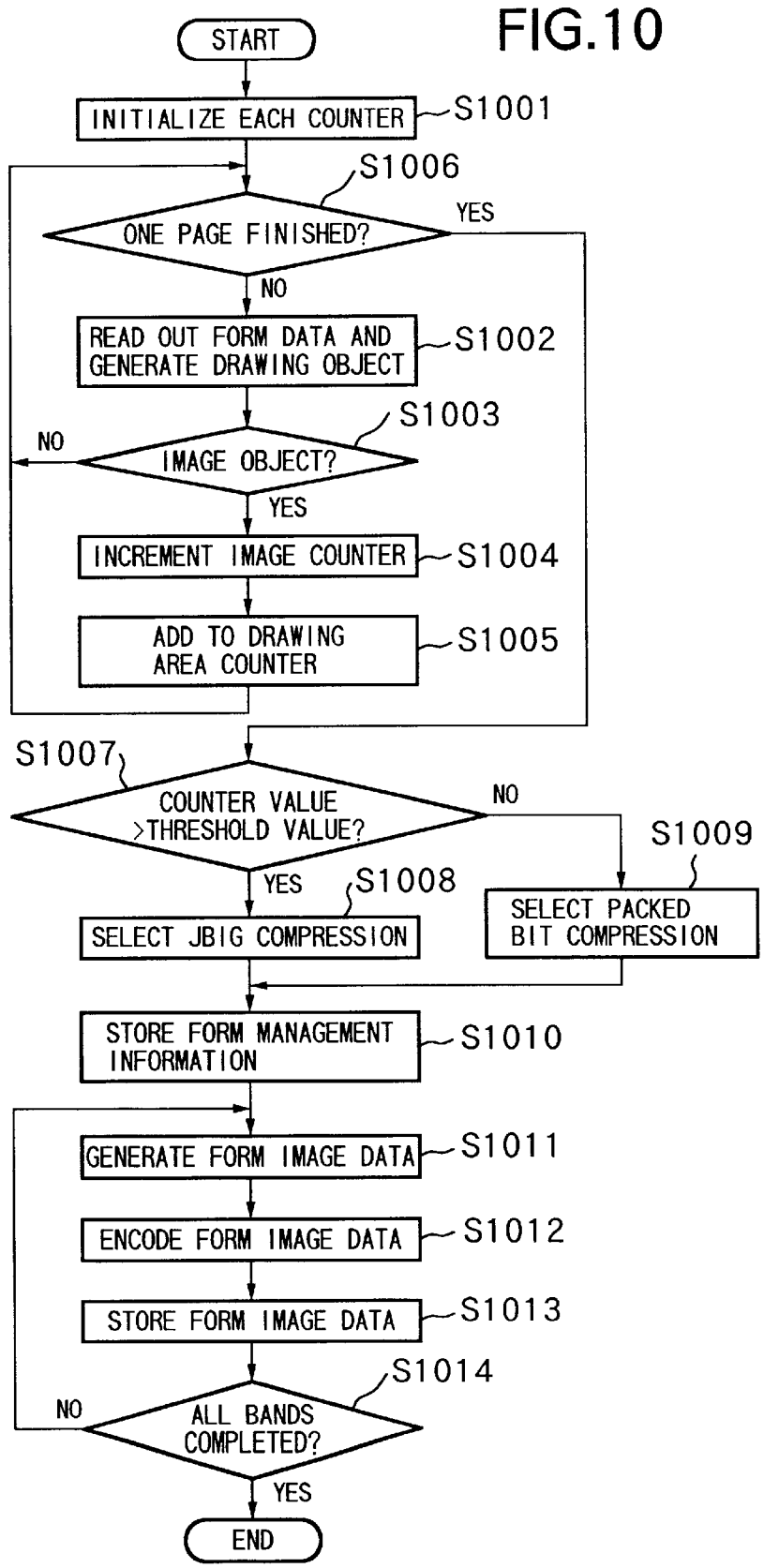
FIG. 10 is a flowchart of a form image generation procedure in the image output apparatus according to a third embodiment of the present invention.

FIG. 10 is a flowchart illustrating a processing procedure for generating a form image according to this embodiment. This procedure can be used instead of steps S309, S310 of FIG. 3 or can be used following step S704 in FIG. 7 or following step S904 in FIG. 9.

This embodiment will be described taking packed bit compression/decompression and JBIG compression/decompression as examples of well-known encoding/decoding methods. Though packed bit compression has a high encoding/decoding processing speed, the compression rate of natural images or the like is not that high. JBIG compression, on the other hand, has an encoding/decoding processing speed lower than that of packed bit compression but the compression rate for natural images is better that of packed bit compression.

In the flowchart of FIG. 10, image counters provided in a RAM or the like are initialized at step S1001. Until it is judged at step S1006 that one page of drawing objects has been generated, already registered form data is read out for every command in page description language, and a drawing object such as a character, image, line or figure is generated in correspondence with each draw command (step S1002). Then, at steps S1003–S1005, degree of complexity is measured in dependence upon the type of drawing object generated. That is, it is determined at step S1003 whether the object is an image object. If the answer is "YES", then a counter for counting image objects is incremented (step S1004), drawing area based upon the image object is calculated and the calculated area is added to a drawing area counter (S1005). If the object generated at step S1002 is not an image object, then control returns to step S1006 so that the next draw command will be processed.

When the generation of the drawing objects of one form is finished, the sum total (the value in the drawing area counter) of the drawing areas of image objects measured at the time of drawing object generation is compared with a predetermined threshold value at step S1007. JBIG compression is selected (step S1008) as the compression method if the sum total is equal to or greater than the threshold value, and packed bit compression is selected (step S1009) if the sum total is less than the threshold value.

This is followed by step S1010, at which form management information for form identification and the compression method selected are stored in the management table 501. Then, from step S1011 onward, form image data is generated in band units (S1011), the form image data is compressed by the selected compression method (S1012), already compressed form image data is stored in the form image storage unit 205d and, at the same time, the leading pointer of each item of form image data and the size of the form image data after compression are stored in the form band table 502 beforehand (step S1013). The processing of steps S1011–S1013 is repeated until all bands of one page are completed. Registration of the form image is then terminated.

When a form is drawn, on the other hand, it will suffice to decompress the form image data compressed in band units after the decompression method corresponding to the compression method stored in the management table is selected.

Executing processing in the manner described above makes it possible to encode form image data by an encoding method suited to the type of object. As a result, the compression rate is raised and more form data can be cached.

In this embodiment, degree of complexity with respect to an image object is measured based solely upon drawing area for the sake of simplicity. In order to improve accuracy, an arrangement maybe adopted in which several hundred bytes, for example, at the beginning of an image object are actually read out, encoding is tried using a plurality of encoding methods and the best encoding method is decided in accordance with the result.

According to this embodiment, the encoding/decoding method is selected on a per-form basis. However, an arrangement may be adopted in which degree of complexity is measured on a per-band basis and compression-type information is retained in the form band table 502 on a per-band basis, whereby the encoding/decoding method is selected band by band. Such an arrangement makes it possible to improve the compression rate of bands for which drawing content is complicated while suppressing a decline in processing speed.

Furthermore, according to this embodiment, the encoding/decoding method is changed over depending upon the type of drawing object. However, an arrangement may be adopted in which the encoding/decoding method is changed over depending upon the availability of storage space in the form image storage unit 205*d*. By adopting this arrangement, encoding can be performed by an encoding method having a high processing speed even if the compression rate is low in a case where there is a large amount of available memory. If the amount of available memory is small, on the other hand, encoding can be performed by a method having a high compression rate even though the processing takes time.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Effects of the Invention

In accordance with the present invention, as described above, raster data is generated from form data, encoded and stored. When a form print instruction is received, the stored form data is decoded and developed as image data. This makes it possible to finish drawing processing at high speed regardless of the content of the form data. In particular, in a case where an ordinary page to be combined with the form data of a single form differs for every page, the time needed to generate form data from the second page onward can be made zero.

Further, since it is unnecessary to retain the same drawing object individually for every page, it is possible to suppress a decline in processing speed associated with waiting for paper discharge or the like and to reduce the amount of memory necessary for drawing.

In a case where the form data has been stored in a non-volatile drive, a form image corresponding to the form data is generated and encoded when power is introduced or by using an idle period during which data to be printed is not being received from a host. As a result, the first print of the first page can be output at high speed.

Further, one page is partitioned into bands and the form image is generated, encoded and stored in band units. When printing of a form is commanded, the form image is decoded successively, read out and drawn in a band memory. This makes it unnecessary to execute preprocessing and skip processing at the time of decoding, and it is easy to apply ordinary page data to an image output apparatus which performs drawing by banding.

When drawing objects are generated, the degree of complexity of the drawing objects of one form is measured and, in accordance with the result of measurement, a selection is made to generate and store a form image or to perform drawing directly from the drawing objects. As a result, even if the content of form data is simple, overhead for managing form image data can be eliminated and it is possible to suppress a decline in processing speed.

Further, when form data of a plurality of forms is printed, overall processing speed can be raised because forms whose form data has complex content are easier to store.

One encoding method suited to the type of object is selected from a plurality of encoding methods in accordance with the type of object contained in a form image. Accordingly, in a printer capable of implementing an encoding/decoding method (a) whose processing speed is high but whose compression rate is low and an encoding/decoding method (b) whose processing speed is low but whose compression rate is high, it is possible to execute processing in which the encoding method is changed over depending upon the type of object.

Further, one encoding method suited to the type of object is selected from a plurality of encoding methods in accordance with the memory capacity that is available for storing a form image. Accordingly, in a printer capable of implementing an encoding/decoding method (a) whose processing speed is high but whose compression rate is low and an encoding/decoding method (b) whose processing speed is low but whose compression rate is high, it is possible to execute processing in which method (a) is used to perform processing at a higher speed in a case where the memory capacity is large and method (b) is used in a case where available memory is small.

Furthermore, when a drawing object is generated before form image data is registered, one of a plurality of encoding/decoding methods is selected on a per-form or per-band basis in dependence upon the degree of complexity of a drawing object that belongs to one form or to one band. As a result, it is possible to carry out form registration in which complicated form data having a large quantity of image data is given priority in terms of compression rate and in which a band involving a light processing load in one page is given priority in terms of processing speed. This makes it possible to use a form image memory more efficiently while suppressing a decline in overall processing speed.

As many apparently widely different embodiments of the present invention can be made without departing from the spirit and scope thereof, it is to be understood that the invention is not limited to the specific embodiments thereof except as defined in the appended claims.

What is claimed is:

1. An image output apparatus for receiving print data described in page description language from a host computer and outputting image data based on the print data, comprising:

determination means for determining whether or not the print data includes a generation command instructing to generate form data;

form generating means for generating form data as image data in a band unit on the basis of the print data when it is determined by said determination means that the print data includes a generation command instructing to generate form data, and encoding the image data in units of bands to generate encoded form data for a page composed of a plurality of bands;

management means for storing, in storage means, the encoded form data in units of bands generated by said form generating means in units of bands and managing the encoded form data in units of bands stored in said form storage means, wherein the encoded form data can be read out from the storage means in units of bands; and overlay output means for decoding the encoded form data in a band that has been stored in the storage means, superposing print data in a band corresponding to the band of the decoded form data, on the decoded form data in the band and outputting the result in a case where the print data is to be output upon being overlaid on the form data.

2. The apparatus according to claim 1, wherein said form generating means generates, encodes and stores the image data based upon form data received together with print data.

3. The apparatus according to claim 1, wherein said form generating means generates, encodes and stores image data based upon form data that has been stored in a non-volatile memory in advance.

4. The apparatus according to claim 3, wherein said form generating means reads out form data and generates a form image when power is introduced to the apparatus or during idle time of the apparatus.

5. The apparatus according to claim 1, wherein said form generating means generates a form image in response to a form generation instruction issued by a host.

6. The apparatus according to claim 1, wherein said form generating means generates, encodes and stores image data in units of individual bands, each of which has a predetermined height, obtained by partitioning one page.

7. The apparatus according to claim 1, wherein said overlay output means performs a process in which the print data is superposed on the decode form data in units of bands and repeats the process for all bands included in a page.

8. The apparatus according to claim 1, wherein said overlay output means superposes ordinary page data other than form data on form data.

9. The apparatus according to claim 1, wherein, in accordance with a degree of complexity of a drawing object included in form data, said form generating means decides to generate and hold image data from form data, to store the drawing object as is or to suspend form generation processing.

10. The apparatus according to claim 9, wherein the degree of complexity is measured based upon processing time required to generate a drawing object.

11. The apparatus according to claim 1, wherein in accordance with available storage capacity of said form storage means, said form generating means decides to generate and hold image data from form data, to store the drawing object as is or to suspend form generation processing.

12. The apparatus according to claim 1, wherein the form data is issued together with a page eject instruction.

13. The apparatus according to claim 1, wherein in accordance with available storage capacity of said form storage means, said form generating means selects one of a plurality of encoding procedures.

14. The apparatus according to claim 1, wherein in accordance with a degree of complexity of an object included in form data, said form generating means selects one of a plurality of encoding procedures.

15. An image output method for receiving print data described in page description language from a host computer and outputting image data based or the print data, said method comprising:

a determining step, of determining whether or not the print data includes a generation command instructing to generate form data;

a form generating step, of generating form data as image data in a band unit on the basis of the print data when it is determined in said determining step that the print data includes a generation command instructing to generate form data, and encoding the image data in units of bands to generate an encoded form data for a page composed of a plurality of bands;

a managing step, of storing, in a storage, the encoded form data in units of bands generated in said form generating step in units of bands and managing the encoded form data in units of bands stored in the storage, wherein the encoded form data can be read out from the storage in units of bands; and an overlay output step, of decoding the encoded form data in a band that has been stored, superposing print data in a band, corresponding to the band of the decoded form data, on the decoded form data and outputting the result in a case where the print data is to be output upon being overlaid on the form data.

16. The method according to claim 15, wherein said form generating step includes generating, encoding and storing the image data based upon form data received together with print data.

17. The method according to claim 15, wherein said form generating step includes generating, encoding and storing image data based upon form data that has been stored in a non-volatile memory in advance.

18. The method according to claim 17, wherein said form generating step includes reading out form data and generating a form image when power is introduced or during idle time.

19. The method according to claim 15, wherein said form generating step includes generating a form image in response to a form generation instruction issued by a host.

20. The method according to claim 15, wherein said form generating step includes generating, encoding and storing image data in units of individual bands obtained by partitioning one page.

21. The method according to claim 15, wherein said form generating step includes generating, encoding and storing image data in units of individual pages.

22. The method according to claim 15, wherein said overlay output step includes superposing ordinary page data other than form data on form data.

23. The method according to claim 15, wherein, in accordance with a degree of complexity of a drawing object included in form data, said form generating step includes deciding to generate and hold image data from form data, to store the drawing object as is or to suspend form generation processing.

24. The method according to claim 15, wherein the degree of complexity is measured based upon processing time required to generate a drawing object.

25. The method according to claim 15, wherein, in accordance with storage capacity available for storage of data in said storage step, said form generating step includes deciding to generate and hold image data from form data, to store the drawing object as is or to suspend form generation processing.

26. The method according to claim 15, wherein the form data is issued together with a page eject instruction.

27. The method according to claim 15, wherein in accordance with storage capacity available for storage of data in said form storage step, said form generating step includes selecting one of a plurality of encoding procedures.

28. The apparatus according to claim 15, wherein, in accordance with a degree of complexity of an object included in form data, said form generating step includes selecting one of a plurality of encoding procedures.

29. A computer-readable memory storing a program which causes a computer, receiving print data described in page description language from a host computer and outputting image data based on the print data, to implement the functions of:

determining means of determining whether or not the print data includes a generation command instructing to generate form data;

form generating means for generating form data as image data in units of bands on the basis of the print data when it is determined by said determining means that the print data includes a generation command instructing to generate form data, and encoding the image data in units of bands to generate encoded form data for a page composed of a plurality of bands;

managing means for storing, in a storage unit, the encoded form data in units of bands generated in said form generating step in units of bands and managing the encoded form data in units of bands stored in the storage unit, wherein the encoded form data can be read out from the storage unit in units of bands; and overlay output means for decoding the encoded form data in a band that has been stored, superposing print data in a band, corresponding to the band of the decoded form data, on the decoded form data and outputting a result in a case where the print data is to be output upon being overlaid on the form data.

* * * * *